United States Patent

[11] 3,595,255

[72] Inventor  Louis W. Mulinex
              6122 Woodward Ave., Maywood, Calif. 90270
[21] Appl. No. 2,334
[22] Filed    Jan. 12, 1970
[45] Patented July 27, 1971

[54] HOSE ATTACHMENT FOR CLEANING CLOGGED DRAIN PIPES
     6 Claims, 4 Drawing Figs.
[52] U.S. Cl. ........................................ 134/167 C, 4/256
[51] Int. Cl. ....................................... B08b 9/02
[50] Field of Search ......................... 134/166 C, 167 C, 168 C, 169 C, 22 C, 24; 4/256; 15/104.3

[56]            References Cited
            UNITED STATES PATENTS
1,893,979  1/1933  Barrere ...................... 134/167 C X
2,755,810  7/1956  Kurt ............................ 134/167 C
3,086,540  4/1963  Anderson ..................... 134/167 C
3,426,774  2/1969  Conn ........................... 134/166 C Primary Examiner—Robert L. Bleutge
Attorney—Beehler and Arant ABSTRACT: The disclosed device for attachment to the end of a water hose includes an inflatable tube having its near end connected to the hose end by an adapter, a restricted flow opening in the adapter, a fitting on the far end of the tubing section having an outlet valve opening, a moveable valve member captured within the fitting, and normally slack chain means interconnected between the valve member and the adapter and passing through the interior of the flexible tubing, the action of the device in response to water pressure being such that the tubing first inflates outwardly and then longitudinally until the tightening of the chain means causes the valve member to retract thus permitting water to escape from the outlet valve opening.

PATENTED JUL 27 1971
3,595,255
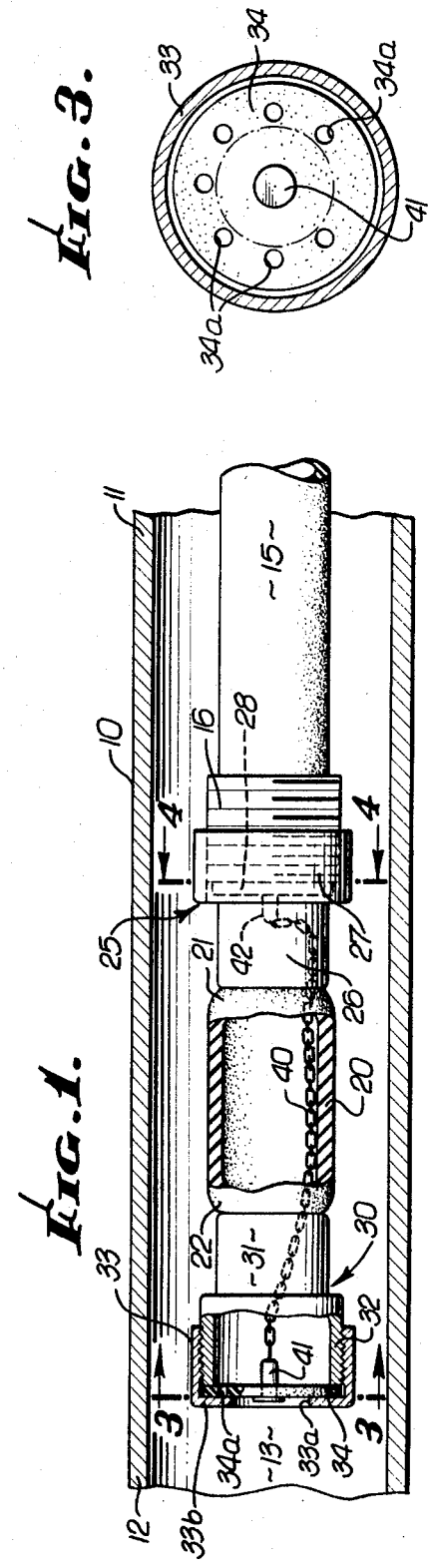
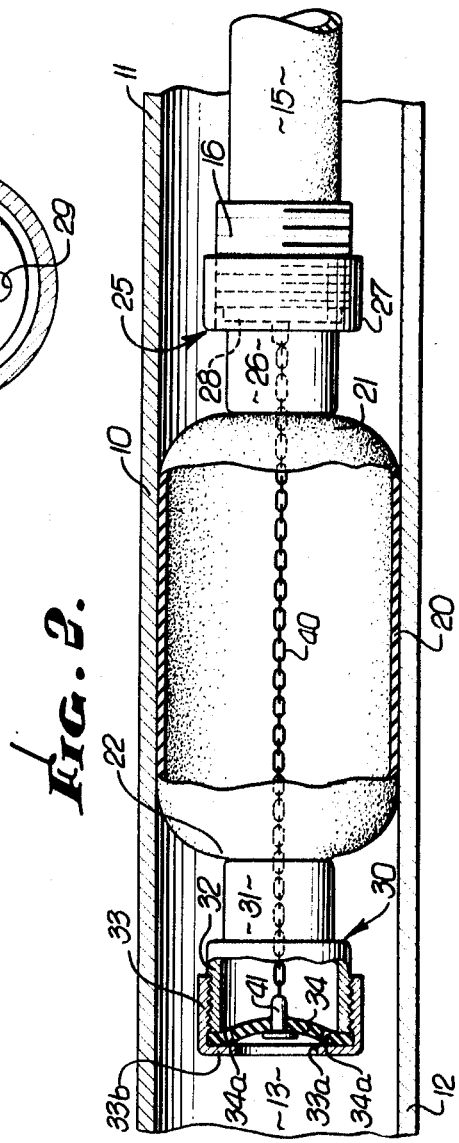
INVENTOR.
LOUIS W. MULINEX
By Beehler & Arant
ATTORNEYS.

HOSE ATTACHMENT FOR CLEANING CLOGGED DRAIN PIPES

BACKGROUND OF THE INVENTION

Inflatable plugs have been known in the prior art, as shown in U.S. Pat. No. 2,755,810 and U.S. Pat. No. 3,086,540. An inherent problem of these devices has been that if the plug is not easily inflated it is not effective as a plug, but if it is easily inflated then it is likely to become overinflated and break open.

Thus, the object of the present invention is to make an inflatable plug for use as a hose attachment, which is workable, reliable, and economical to manufacture.

DRAWING SUMMARY

FIG. 1 is a longitudinal view, partially in cross section, of the hose attachment of the present invention inserted into a pipeline;

FIG. 2 is a view like FIG. 1 showing the device in its inflated condition;

FIG. 3 is a transverse cross-sectional view taken on the line 3-3 of FIG. 1; and FIG. 4 is a transverse cross-sectional view taken on the line 4-4 of FIG. 1.

DETAILED DESCRIPTION

Referring now to the drawing, a pipeline 10 is typically a drain pipe having an accessible end 11, an inaccessible end 12 and an obstructed area 13 near its inaccessible end. A water hose 15 having an end coupler 16 is used for propelling the attachment of the present invention into the pipeline 10, and also for supplying necessary water to it.

The invention itself includes a short section 20 of flexible, inflatible tubing, being typically made of gum rubber which is highly stretchable. An adapter 25 is attached to one end 21 of the tubing 20, while a fitting 30 is attached to its other end 22.

The adapter 25 has a small diameter section 26 which is immediately attached to the tubing end 21, and a large diameter portion 27 which is internally threaded for engaging the external threads on the male hose coupler 16. A circular plate 28 (FIG. 4) is retained within the adapter end 27 and has a small opening 29 which permits water to flow from hose 15 into the interior of tubing 20. The reason for this restriction in flow will be explained subsequently.

Fitting 30 includes a small diameter portion 31 which is immediately attached to the tubing end 22, a larger diameter portion 32 having an external thread, and an end cap 33 which is provided with an internal thread for engaging the fitting portion 32. End cap 33 has a flat end surface forming a peripheral flange 33b, and a large central opening 33a is defined within the flange 33b. The end opening 33a forms a valve opening which is closed off while the tubing 20 is being inflated, but then is opened up again in a manner which will be subsequently explained.

A circular resilient valve member 34 made of stretchable material is disposed on the outer end of fitting portion 32 and is firmly retained at its outer circumferential edge by the end cap 34 (See FIG. 2). The valve member 34 has a number of small openings 34a which are circumferentially spaced near its outer circumferential edge (see FIG. 3). When the tubing 20 is being inflated the valve member 34 remains against the flange 33b of end cap 33 in such manner as to cover the openings 34a, hence the central portion of valve member 34 effectively closes off the valve opening 33a.

The remaining element of the present invention is a chain means 40 which is normally slack when the tubing 20 is being inflated. The chain 40 on one end has an attachment link 41 which is secured to the center of the valve member 34 (FIGS. 1, 2 and 3) and on its other end has an attachment link 42 which is attached to the plate 28 (FIGS. 1, 2 and 4). Chain 40 extends through the interior of fitting 30, the interior of tubing 20, and the interior of adapter 25.

The operation of the invention is as follows. The attachment is attached to hose 15 by threading adapter portion 27 over the male coupler 16. At this time the hose is not being supplied with water. The hose bearing the adapter is inserted into the accessible end 11 of pipeline 10, and is pushed along until the adapter is well within the pipeline, though not necessarily in contact with the obstructed area 13. Then the water is turned on so that water flows through the hose 15.

Water flowing through the hose meets the restricted opening 29 in plate 28, and hence the water flows rather slowly into the interior of tubing 20 while the pressure level inside the hose 15 reaches a maximum. The pressure plate 28 and opening 29 cause the rate of flow into tubing 20 to be independent of the extent of opening of a water faucet to which hose 15 is connected. The small stream of water flowing through opening 29 into the interior of tubing 20 gradually fills the interior of tubing 20 with water, and the existence of this water inside the attachment holds valve member 34 tight against the end cap flange 33b keeping the valve opening 33a closed. A further flow of water through the opening 29 causes the tubing 20 to expand laterally, in a direction transverse to the pipeline 10 (not specifically shown in the drawing). This lateral inflation of the tubing 20 has the effect of sealing or plugging the pipeline.

A further continued flow of water through the opening 29 causes tubing 20 to inflate or expand in the longitudinal direction (see FIG. 2). This longitudinal expansion comes about because further lateral expansion is prevented by the pipeline 10, and yet the tubing 20 is sufficiently stretchable so that further expansion is still possible. The only way this expansion can move, therefore, is in a longitudinal direction. The result of that movement is to tighten up the chain 40, shown in its normally slack position in FIG. 1, until is assumes a taut position as shown in FIG. 2. Tightening of the chain 40 causes it to stretch the valve member 34 and pull its central portion away from the valve opening 33a. Water is then able to escape from the attachment by flowing through the small openings 34a into the space between valve member 34 and end flange 33b, and hence through the valve opening 33a out into the inaccessible obstructed area 13. The effective maximum cross-sectional area of the valve opening is the sum total of the openings 34a.

Because of the stretchable nature of valve member 34 the effective outlet opening is a variable, and increases as the pressure inside tubing 20 builds up, but the opening does not become large enough to permit tubing 20 to deflate or to lose its firm grip on the pipe wall.

While a particular configuration of valve opening 33a and valve member 34 have been shown, other configurations may be used equally well so long as the tightening of the chain means 40 is effective to retract the valve member away from the valve opening, in a manner which produces a variable outlet opening.

The near end of chain means 40 is shown connected by link 42 to the plate 28, however, the attachment link 42 may, if desired, be connected directly to the adapter 25 at any convenient point thereon.

It is essential that the total area of the small outlet openings 34a be greater than the total area of the inlet opening 29. Stated conversely, the cross-sectional area of inlet opening 29 must be less than the maximum effective area of the valve opening. This relationship prevents tubing 20 from being burst by excessive pressure. Of course, other configurations and other means may, if desired, be utilized for providing inlet and outlet openings for the hose attachment of the present invention.

While the obvious function of the chain means 40 is to retract the valve member 34 away from the valve opening, it also has another function. If the device is damaged or broken open by sharp protuberances in the pipe, chain means 40 is used to retract all of the parts of the device.

What I claim is:

1. A device to aid in the flushing of a clogged drain pipe with a water hose, comprising:

a short section of flexible, inflatable tubing;

an adapter attached to one end of said tubing for securement to the hose end;

a fitting attached to the other end of said tubing, having a valve opening therein;

a valve member cooperating with said fitting, and normally closed against said valve opening;

and normally slack chain means connected to said valve member and hence through the interior of said tubing to said adapter;

the application of water through the hose into said tubing serving to expand said tubing laterally into contact with the pipe wall, and thereafter to expand said tubing longitudinally of the pipe causing said chain means to become taut and thereby retract said valve member from said valve opening.

2. A device as claimed in claim 1 wherein said adapter has a restricted inlet opening whose cross-sectional area is less than that of said valve opening.

3. A device as claimed in claim 2 wherein said valve member is captured within said fixture.

4. A device as claimed in claim 1 wherein said valve member is captured within said fixture.

5. A device as claimed in claim 1 wherein the effective outlet opening provided by said valve opening varies as a function of the pressure level within said tubing.

6. A device as claimed in claim 5 wherein said fitting includes an end cap having a central opening providing said valve opening, said valve member is a stretchable disc having its circumferential edge firmly gripped by said end cap, said valve member has circumferentially spaced openings normally engaging said end cap, and said chain means is connected to the center of said valve member for pulling the openings in said valve member away from said end cap.